Louis Raymond's,
Improved construction of Kegs &c. out of rings of Wood
73461      PATENTED
Fig. 1  JAN 21 1868
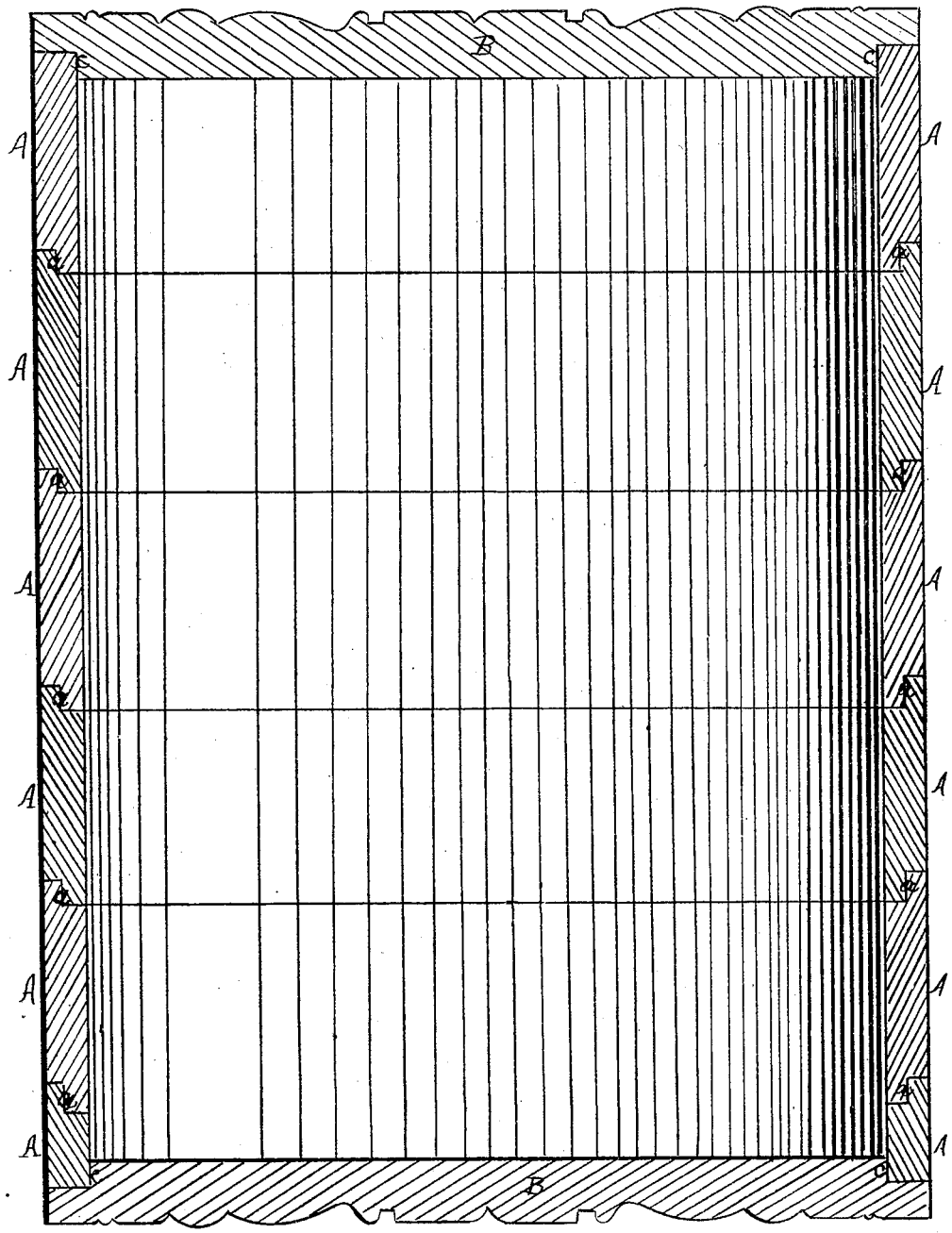
Witnesses.
Jno. D. Patten
S. Morris Pool
Louis Raymond
By atty A.B. Stoughton

United States Patent Office.

LOUIS RAYMOND, OF ROCKLAND, DELAWARE.

*Letters Patent No. 73,461, dated January 21, 1868.*

IMPROVEMENT IN METHOD OF MAKING BARRELS.

*The Schedule referred to in these Letters Patent and making part of the same.*

TO ALL WHOM IT MAY CONCERN:

Be it known that I, LOUIS RAYMOND, of Rockland, in the county of New Castle, and State of Delaware, have invented certain new and useful Improvements in the Manner of Making Kegs or Casks for holding dry substances, such as gunpowder, spices, tobacco, and other material; and I do hereby declare the following to be a full, clear, and exact description of the same, reference being had to the accompanying drawing marked Figure 1, and which represents a vertical section through a keg made after my plan.

I am aware that barrels and kegs have been made without using staves, and known as "seamless barrels." But I am not aware that any kegs or barrels have ever been made that were contemplated to be used without hoops, or their equivalent holding-devices. Nor do I know that a keg, barrel, or other similar cask or vessel has ever, before I did it, been made of a series of rings matched and secured together by glue, or its substitute, for holding said rings together.

My invention consists in making a keg, cask, or other similar vessel, of a series of rings united by half-laps, or by tongues and grooves, or dowels in the adjacent rings, and, for greater security and strength, the uniting of the rings by glue, or its equivalent cementing or adhering substitute.

To enable others skilled in the art to make and use my invention, I will proceed to describe the same with reference to the drawing.

A A A represent a series of concentric rings, cut out of wood, (for convenience out of sawed plank, and in nests for economy, and to make various sizes.) A half-lap, $a$, is formed upon each one of the series of rings where it is to be united to the next adjacent ring, and are formed alternately on the outside and inside of the rings at their ends, as seen in the drawing. To form the keg, glue, or its equivalent, is put in the joint or half-lap, and the rings laid up until the sufficient size is attained, then by pressure, (screw or otherwise,) the series of rings are all brought close up together, making a tight joint, and, when the glue sets, a very strong structure. The heads B B may be let into the cylinder by shoulders, $c\,c$, as seen, or screwed in, if preferred, so that they may be taken out readily, and the bung, when one is used, may be screwed into the head or the body, as may be preferred. For powder-kegs, it is in one of the heads. The lap-joints $a$ may be simply turned off smooth, or they may have a male and female-screw thread formed on them, so that they may be screwed one to or upon the other. Or, as before stated, they may be tongued and grooved together, or dowelled, and the dowel may be a hoop or ring of wood or sheet metal, or only a portion of a hoop or ring. Many different plans of uniting the rings may be essayed, but some device must be used which shall cross the joint or "break the joint," as it is termed, so as to give the keg sufficient strength. And, if desirable to do so, the rings may be so turned as to give a bilge to the keg or cask.

Having thus fully described my invention, what I claim therein as new, and desire to secure by Letters Patent, is—

A keg or cask made of a series of wooden rings, put together with a glued break-joint, substantially in the manner and for the purpose set forth.

LOUIS RAYMOND.

Witnesses:
 JAMES MOORE,
 CHARLES A. WIGGINS,
 WM. B. WIGGINS.